United States Patent Office 3,155,745
Patented Nov. 3, 1964

3,155,745
THERMOPLASTIC WELDING COMPOSITION
George J. Kliner and James F. Attridge, Avon Lake, Ohio, assignors to The B. F. Goodrich Company, New York, N.Y., a corporation of New York
No Drawing. Filed Dec. 18, 1961, Ser. No. 160,261
8 Claims. (Cl. 260—899)

This invention relates to a novel thermoplastic welding composition and more particularly pertains to a fused mixture of a post-halogenated polyvinyl chloride resin and a halogenated polyether and to the method for using said mixture in welding together articles fabricated from post-chlorinated polyvinyl chloride resin.

It is an object of the present invention to provide a thermoplastic welding composition which can be used to form welds in thermoplastic articles, said welds having strengths approaching the strength of the parent article.

Novel vinyl compositions having increased high temperature tolerance including good heat resistance and materially increased softening or flow points are described and claimed in U.S. Patent No. 2,996,489. The chlorinated polyvinyl chloride resins embodied in the present invention include those disclosed and covered by the claims of the aforementioned patent as well as those disclosed in the copending U.S. patent application of Joseph C. Shockney, Serial No. 101,654, filed April 10, 1961.

The halogenated polyethers, and more specifically the chlorinated polyethers, embodied in the compositions of this invention are those described in U.S. Patents Nos. 2,722,520; 2,794,027; 2,831,825; 2,895,931 and in "Journal of Applied Chemistry," vol 8, pages 186–196 (1958), as well as in the bulletin "Penton Molding Powder," copyright 1955, by Hercules Powder Company, Wilmington 99, Delaware.

We have discovered a novel welding composition comprising a mixture of 100 parts by weight of a chlorinated polyvinyl chloride resin and from about 5 to 25 parts by weight of a polymer of 3,3-bis(chloromethyl) oxetane.

The polymers of 3,3-bis(chloromethyl) oxetane embodied herein are preferably the high molecular weight resinous homopolymers such as that sold under the name "Penton," which products are more fully described in "Journal of Applied Chemistry," vol 8, page 189, lines 5–9 (1958), "Chemical and Engineering News," vol. 34, 6210 (1956), "Industr. Chem. Mfr.," vol. 33, 38 (1957), and "Modern Plastics," 34, 150 (1957). Preferred in the present invention is the resinous homopolymer of 3,3-bis(chloromethyl) oxetane having the structure

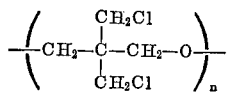

wherein $n$ is an integer greater than one.

The term "chlorinated polyvinyl chloride resins" and like terms as used herein include within their meanings not only the thermoplastic, post-chlorinated homopolymers of vinyl chloride but also the thermoplastic, resinous, post-chlorinated copolymers of vinyl chloride with minor amounts, i.e., not more than about 5% by weight based on the total weight of the copolymer, of copolymerizable monomers containing a single 1-monoolefinic or vinyl type group

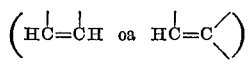

Illustrative, monoolefinically unsaturated comonomers are vinylidene chloride, vinyl acetate, methyl acrylate, styrene, acrylonitrile, methyl methacrylate, ethylene, propylene and others. However, the post-chlorinated homopolymer of vinyl chloride is greatly preferred.

Preferred in the present invention are chlorinated polyvinyl chloride resins having densities at 25° C. in the range of 1.43 to 1.65 g. per cc. and being further characterized by the fact that they do not turn black in the unstabilized condition when exposed for 10 minutes to air at a temperature of 375° F. Resins of this type are described in the aforementioned U.S. Patent No. 2,996,489 and the application Serial No. 101,654, filed April 10, 1961.

The welding compositions embodied herein are most useful for welding together articles made of post-chlorinated polyvinyl chloride resins and articles made from mixtures of post-chlorinated polyvinyl chloride resins and a minor amount of chlorinated polyethylene. The last-mentioned high-impact, chemical resistant resin blends are of the type more fully described in the copending patent application of George J. Kliner and Garland B. Jennings, Serial No. 107,929, filed May 5, 1961, which application claims blends of from two to less than ten parts by weight of homogeneously chlorinated, high-density polyethylene and 100 parts by weight of after-chlorinated polyvinyl chloride.

Although the welding compositions embodied herein are most useful in the form of rods or tapes of the type commonly used in the "hot gas welding" process, they may be used in other shapes or forms depending upon the particular welding application. The welding process, which is well known in the art, involves the use of welding composition usually in the from of a rod or tape and a hot gas welding gun and is similar to the acetylene welding process used in the metal fabrication field. The hot gas method, however, does not call for a flame but rather a heated gas which is emitted from a nozzle to cause fusion of part of the welding rod and the surface of the substrate at the point of the weld. Conventional weld types including butt, corner, edge, lap and fillet welds can be made using the hot gas technique employing the compositions embodied herein. Sheet and pipe as well as articles in other forms of the post-chlorinated polyvinyl chloride resins can be welded with the composition embodied herein. Contrary to the teachings of the prior art that normally in the hot gas welding of plastics a welding rod of identical composition to the parent material must be used, we have discovered that the novel welding compositions embodied herein, which are not identical with the parent composition, are unexpectedly far superior to welding material consisting of the parent composition.

Presently known plastics welding techniques are discussed in a thorough manner in the text "Welding of Plastics," by J. A. Neumann and F. J. Bockhoff, Reinhold Publishing Corp., New York, 1959. Reference is made in particular to the chapter entitled "Hot Gas Welding" in the aforementioned text. See also "Chemical Engineering", November 1952, page 279, last paragraph and "Materials and Methods", June 1954, pages 132 and 133.

It is to be understood that conventional fillers, color pigments, lubricants, and the like may be used in minor proportions in the compositions and processes embodied herein without departing from the scope of this invention.

In the following example, which will serve to further illustrate the products and processes of the present invention, the amounts of ingredients are expressed in parts by weight unless otherwise indicated.

EXAMPLE

The welding rod having the compositions shown in the following table was prepared by Banbury mixing the specified ingredients (360–400° F.), milling into sheets (stock temperatures between 360 and 400 F.) and finally extrustion of the fused mixture into rods having a diameter of about ⅛" employing a stock temperature of from 380–440° F. in the extruder. In each case 5 parts of tribasic lead sulfate per 100 parts of polymer was included in the welding composition as stabilizer. Other stabilizers can be used such as many of those used in unplasticized polyvinyl chloride resins as well as many of those disclosed in the literature cited above.

The edges of the plastic sheets tested were welded using a double V weld on sheet edges which had been beveled at a 30° angle. In each case the strength of bond was observed by attempting to strip the bead from the weld manually with a pair of pliers after the welded article was cooled to room temperature. Tensile at the bond was determined using a Baldwin tensile tester and the paws of the grips of the tensile tester were 1 inch away from the edge of the weld. The tensile thus obtained in each case was compared with the tensile of the original sheet material. The original tensiles of the sheet material were all in the order of 7500–8000 p.s.i. The plastic sheets were made in a conventional manner and each was stabilized with 3 parts of a mixed cadmium-barium salt of a mixture of fatty acids sold as "Ferro 1827".

Double welds were made using the hot gas welding gun technique. The particular welding gun used is electrically heated operating directly from a 110 volt A.C. electric current source and the gun temperature is regulated by the flow of air. An air pressure of from 1 to 10 p.s.i.g. was used and a temperature ranging from 500–650° F. as measured ¼" from the welding gun tip was used in making the welds. The welds were all made by the same skilled operator.

In the following table the resin is always an afterchlorinated polyvinyl chloride which has the indicated density at 25° C. and also possesses a heat stability in the unstabilized condition such that a pressed film of same does not turn black when exposed for 10 minutes to air at a temperature of 375° F.

In the following table the modifier is either a homogeneously chlorinated high density polyethylene containing about 35% chlorine or the aforementioned homopolymer of 3,3-bis(chloromethyl) oxetane which is sold as "Penton". The amounts of modifier are all expressed as parts by weight per 100 parts by weight of the resin except in the case in which the welding rod was made entirely of Penton (100 Penton).

We claim:
1. The composition comprising 100 parts by weight of a chlorinated vinyl chloride resin selected from the group consisting of chlorinated vinyl chloride homopolymers and chlorinated vinyl chloride copolymers containing at least about 95% by weight of polymerized vinyl chloride units and up to about 5% by weight of polymerized units of a 1-monoolefinically unsaturated monomer copolymerizable with vinyl chloride, and from about 5 to about 25 parts of a polymer of 3,3-bis(chloromethyl) oxetane.

2. The composition comprising 100 parts by weight of chlorinated chloride resin having a density of from 1.43 to 1.65 grams/cc. at 25° C. selected from the group consisting of chlorinated vinyl chloride homopolymers and chlorinated vinyl chloride copolymers containing at least about 95% by weight of polymerized vinyl chloride units and up to about 5% by weight of polymerized units of a 1-monoolefinically unsaturated monomer copolymerizable with vinyl chloride, and from about 5 to about 25 parts by weight of the resinous homopolymer of 3,3-bis(chloromethyl) oxetane.

3. The welding composition comprising (1) 100 parts by weight of chlorinated vinyl chloride resin having a density of from 1.43 to 1.65 grams/cc. at 25° C. selected from the group consisting of chlorinated vinyl chloride homopolymers and chlorinated vinyl chloride copolymers containing at least about 95% by weight of polymerized vinyl chloride units and up to about 5% by weight of polymerized units of a 1-monoolefinically unsaturated monomer copolymerizable with vinyl chloride and being further characterized by the fact that it does not turn black when exposed in the unstabilized condition to air for 10 minutes at a temperature of 375° F. and (2) from about 5 to 25 parts by weight of the resinous homopolymer of 3,3-bis(chloromethyl) oxetane.

4. A welding rod composed of a fused mixture comprising (1) 100 parts by weight of chlorinated vinyl chloride resin having a density of from 1.43 to 1.65 grams/cc. at 25° C. selected from the group consisting of chlorinated vinyl chloride homopolymers and chlorinated vinyl chloride copolymers containing at least about 95% by weight of polymerized vinyl chloride units and up to about 5% by weight of polymerized units of a 1-monoolefinically unsaturated monomer copolymerizable with vinyl chloride, and being further characterized by the fact that it does not turn black when exposed in the unstabilized condi- Table

| Welding Rod | | Sheet Material | | Properties of Weld | |
| --- | --- | --- | --- | --- | --- |
| Resin | Modifier | Resin | Modifier | Bond | Percent Retention of Original Tensile of Sheet Material |
| Density, 1.56–1.58 | None | Density, 1.56–1.58 | None | Slight | 37. |
| Do | do | do | 5 chlorinated polyethylene | do | 32. |
| Do | do | Density, 1.54–1.55 | None | Medium | 56. |
| Density, 1.54–1.55 | do | Density, 1.56–1.58 | do | Slight | 42. |
| Do | do | do | 5 chlorinated polyethylene | Medium | 56. |
| Do | do | Density, 1.54–1.55 | None | Medium | 62. |
| Density, 1.56–1.58 | 3 chlorinated polyethylene | Density, 1.56–1.58 | do | Medium | 55. |
| None | 100 Penton | Density, 1.56–1.58 | None | No bond | No test. |
| Do | do | do | 5 chlorinated polyethylene | do | Do. |
| Do | do | Density, 1.54–1.55 | None | do | Do. |
| Density, 1.56–1.58 | 5.25 Penton | do | do | Good | 78. |
| Do | 11.1 Penton | do | do | do | 88. |
| Do | 14.35 Penton | do | do | do | 94. |
| Do | 25 Penton | do | do | do | 79. |
| Do | 67 Penton | do | do | No bond | No test. |
| Do | 150 Penton | do | do | do | Do. |
| Do | 400 Penton | do | do | do | Do. |
| Density 1.54–1.55 | 2 Penton | do | do | Good | 54. |
| Do | 3 Penton | do | do | do | 63. |
| Do | 5.25 Penton | do | do | Good | 80. |
| Do | 11.1 Penton | do | do | do | 94. | tion to air for 10 minutes at a temperature of 375° F. and (2) from about 5 to 25 parts by weight of the resinous homopolymer of 3,3-bis(chloromethyl) oxetane.

5. A welding tape composed of a fused mixture comprising (1) 100 parts by weight of chlorinated vinyl chloride resin having a density of from 1.43 to 1.65 grams/cc. at 25° C. selected from the group consisting of chlorinated vinyl chloride homopolymers and chlorinated vinyl chloride copolymers containing at least about 95% by weight of polymerized vinyl chloride units and up to about 5% by weight of polymerized units of a 1-monoolefinically unsaturated monomer copolymerizable with vinyl chloride, and being further characterized in that it does not turn black when exposed in the unstabilized condition to air for 10 minutes at 375° F. and (2) from about 5 to 25 parts by weight of the resinous homopolymer of 3,3-bis(chloromethyl) oxetane.

6. The article of claim 8 wherein the chlorinated polyethylene is a homogeneously chlorinated high density polyethylene.

7. An article comprising (A) a base material composed of post-chlorinated vinyl chloride resin and (B) integrally fused to said base material a welding composition comprising a blend of 100 parts by weight of post-chlorinated polyvinyl chloride resin and from about 5 to 25 parts by weight of a resinous homopolymer of 3,3-bis(chloromethyl) oxetane, said polyvinyl chloride resin of (A) and (B) selected from the group consisting of chorinated vinyl chloride homopolymers and chlorinated vinyl chloride copolymers containing at least about 95% by weight of polymerized vinyl chloride units and up to about 5% by weight of polymerized units of a 1-monoolefinically unsaturated monomer copolymerizable with vinyl chloride, characterized by having a density of from 1.43 to 1.65 grams/cc. at 25° C. and further characterized in that it does not turn black when exposed in the unstabilized condition to air for 10 minutes at 375° F.

8. An article comprising (A) a base material composed of a blend of a major proportion of post-chlorinated vinyl chloride and a minor proportion of chlorinated polyethylene and (B) integrally fused to said base material a welding composition comprising a blend of 100 parts by weight of post-chlorinated polyvinyl chloride resin and from about 5 to 25 parts by weight of a resinous homopolymer of 3,3-bis(chloromethyl) oxetane, said polyvinyl chloride resin of (A) and (B) selected from the group consisting of chlorinated vinyl chloride homopolymers and chlorinated vinyl chloride copolymers containing at least about 95% by weight of polymerized vinyl chloride units and up to about 5% by weight of polymerized units of a 1-monoolefinically unsaturated monomer copolymerizable with vinyl chloride, characterized by having a density of from 1.43 to 1.65 grams/cc. at 25° C. and further characterized in that it does not turn black when exposed in the unstabilized condition to air for 10 minutes at 375° F.

References Cited by the Examiner
UNITED STATES PATENTS

| | | | |
|---|---|---|---|
| 2,722,340 | 11/55 | Feild et al. | 260—20 |
| 2,872,432 | 2/59 | Metzger | 260—836 |
| 2,925,403 | 2/60 | Shokal | 260—836 |
| 2,996,489 | 8/61 | Dannis et al. | 260—92.8 |

MURRAY TILLMAN, *Primary Examiner.*
LEON J. BERCOVITZ, WILLIAM H. SHORT,
*Examiners.*

UNITED STATES PATENT OFFICE
CERTIFICATE OF CORRECTION

Patent No. 3,155,745            November 3, 1964

George J. Kliner et al.

It is hereby certified that error appears in the above numbered patent requiring correction and that the said Letters Patent should read as corrected below.

Column 1, line 67, for "oa" read -- or --; column 3, line 16, for "paws" read -- jaws --; column 4, line 13, after "chlorinated" insert -- vinyl --; column 5, lines 25 and 27, for "polyvinyl", each occurrence, read -- vinyl --; column 6, line 6, after "chloride" insert -- resin --; same column 6, lines 9 and 12, for "polyvinyl", each occurrence, read -- vinyl --.

Signed and sealed this 4th day of May 1965.

(SEAL)
Attest:

ERNEST W. SWIDER            EDWARD J. BRENNER
Attesting Officer            Commissioner of Patents